United States Patent [19]
Meyer

[11] Patent Number: 5,484,242
[45] Date of Patent: Jan. 16, 1996

[54] SNAP RING RETAINING WASHER

[75] Inventor: Duane F. Meyer, Waterloo, Iowa

[73] Assignee: Deere & Company, Moline, Ill.

[21] Appl. No.: 274,090

[22] Filed: Jul. 12, 1994

[51] Int. Cl.$^6$ ................................................. F16B 21/18
[52] U.S. Cl. .................................. 411/353; 411/517
[58] Field of Search .................................. 411/352, 353, 411/517, 518, 519, 521, 531, 533, 546, 547; 403/154, 155, 359

[56] References Cited

U.S. PATENT DOCUMENTS

| | | |
|---|---|---|
| 2,402,693 | 6/1946 | Summerbell . |
| 2,456,572 | 12/1948 | Wagstaff . |
| 2,463,323 | 3/1949 | Sichman ................................... 411/517 |
| 2,895,754 | 7/1959 | Wurzel ...................................... 411/518 |
| 2,933,970 | 4/1960 | Pagano . |
| 2,948,317 | 8/1960 | Munro ....................................... 411/352 |
| 2,960,359 | 11/1960 | Leland ...................................... 411/517 |
| 3,062,253 | 11/1962 | Millheiser . |
| 3,442,171 | 5/1969 | Engelmann . |
| 4,459,119 | 7/1984 | Beijer . |
| 5,085,548 | 2/1992 | Moyles . |
| 5,131,894 | 7/1992 | Hilker ....................................... 403/155 |

FOREIGN PATENT DOCUMENTS

| | | | |
|---|---|---|---|
| 349329 | 5/1931 | United Kingdom ................... 411/517 |
| 845333 | 12/1960 | United Kingdom ................... 411/518 |

*Primary Examiner*—Flemming Saether

[57] ABSTRACT

A washer includes at least one tooth interlocked with a spline of a shaft in order to retain the washer from rotating relative to the shaft. A snap ring is positioned in a groove of the shaft. The washer includes a stop nested in a gap of the snap ring in order to retain the snap ring from rotating relative to the shaft. Preferably, the washer includes at least one catch that flanks the stop and overlaps the snap ring in order to retain the snap ring in the groove.

7 Claims, 1 Drawing Sheet

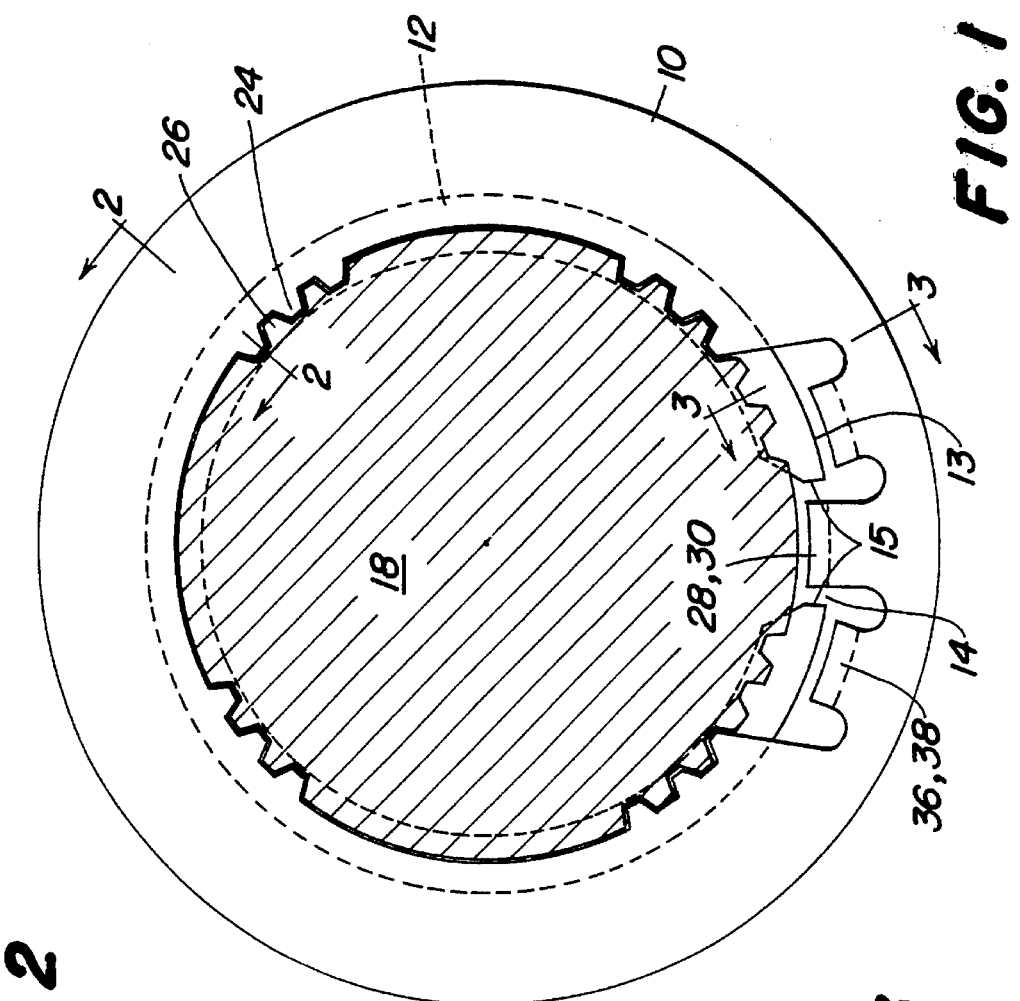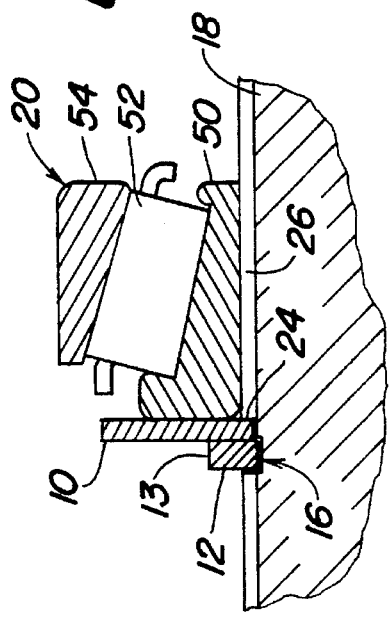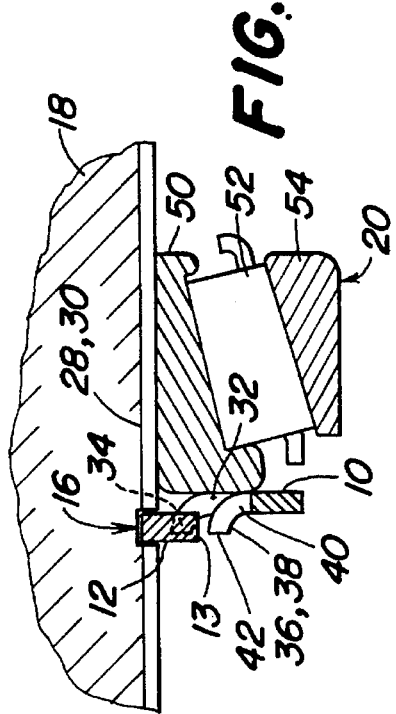

SNAP RING RETAINING WASHER

TECHNICAL FIELD

The invention relates generally to washers for retaining a snap ring, and more particularly to washers for retaining a snap ring from rotation relative to a shaft.

BACKGROUND ART

Snap rings are often installed in a groove of a shaft. Commonly, the snap ring is of an annular shape that is broken by an opening or a gap. Thus, the shape of the snap ring broadly may resemble the letter "C." Usually, the snap ring provides a shoulder for supporting or retaining another member, such as a rolling bearing, on the shaft. For example, a tapered roller bearing may be seated against the snap ring on the shaft of a work vehicle transmission. Unfortunately, the snap ring may turn or rotate relative to the shaft, resulting in wear of the snap ring.

Rotation of the snap ring may adversely affect the member it supports or retains on the shaft. For instance, after tapered roller bearings are installed on the shaft, an axial adjustment is needed in order to provide a proper bearing running clearance between the respective cones and cups. Wear of the snap ring or the walls of the groove of the shaft caused by rotation of the snap ring relative to the shaft may result in loosening of the bearing setting or reduction in operating efficiency.

One design has installed a thrust washer on the shaft between the snap ring and the tapered roller bearing. Shortcomings of this design include possible rotation of the snap ring relative to the shaft, wear of the snap ring and washer, and loosening of the setting of the tapered roller bearing.

Another design has provided a lock washer having tabs bent over peripheral edges of a spring type retainer, such as the snap ring, in order to oppose radial distortion of the retainer out of its position, such as in the groove of the shaft, and prevent axial separation of the lock washer and the retainer. Shortcomings of the design include possible rotation of the retainer relative to the shaft and consequent wear of the retainer. A design of this type is shown in U.S. Pat. No. 4,459,119.

SUMMARY OF THE INVENTION

One object of the invention is to reduce wear of a snap ring.

Another object is to retain a snap ring from rotation relative to a shaft.

A further object of the invention is to fix a snap ring in a groove of a shaft.

According to the present invention, the foregoing and other objects and advantages are attained by providing a washer that includes at least one tooth interlocked with a spline on a shaft in order to retain the washer from rotating relative to the shaft. A stop or tab on the washer is nested in a gap of a snap ring that is positioned in an annular groove formed on the shaft in order to retain the snap ring from rotating relative to the shaft. The washer includes at least one catch or tab that overlaps the snap ring in order to retain the snap ring in the groove.

Additional objects, advantages, and novel features of the invention will become apparent to those skilled in the art upon examination of the following detailed description of the preferred embodiments of the invention when read in conjunction with the accompanying drawings.

BRIEF DESCRIPTION OF THE DRAWINGS

FIG. 1 is a view, partially in section, showing a washer constructed according to the present invention and a snap ring mounted on a shaft.

FIG. 2 is a sectional view taken substantially along line 2—2 of FIG. 1.

FIG. 3 is a sectional view taken substantially along line 3—3 of FIG. 1.

DETAILED DESCRIPTION OF THE PREFERRED EMBODIMENTS OF THE INVENTION

As shown in the drawings for purposes of illustration, the present invention is embodied in a washer 10 for retaining a snap ring 12. The snap ring 12 has a radially outer surface 13 and a gap 14 that is defined by ends 15. The snap ring 12 is positioned in a groove 16 formed on a shaft 18 and may support or retain another member, such as a rolling bearing 20, on the shaft 18. The washer 10 preferably is positioned between the snap ring 12 and the rolling bearing 20. For example, the rolling bearing 20 may be a tapered roller bearing that is supported by the snap ring 12 where the washer 10 separates the snap ring 12 from the tapered roller bearing.

The washer 10 includes a tab or a tooth 24 that is interlocked with a spline 26 formed on the shaft 18.

Preferably, the washer 10 has a plurality of teeth 24 that engage a plurality of splines 26 extending substantially parallel to the axis of the shaft 18. As shown in FIG. 1, the gap 14 may overlap some of the splines 26. Preferably, the splines 26 are formed on the shaft 18 in a symmetrical distribution of groups that cooperate with the arrangement of the teeth 24 to make assembly of the washer 10 onto the shaft 18 easier by permitting several different installation orientations of the teeth 24 relative to the splines 26.

The stop 28 is formed as bent tab 30 that a substantially radially extending leg 32. The foot 34 projects into the gap 14 for engagement with the ends 15 of the snap ring 12 in order to prevent rotation of the snap ring 12 relative to the washer 10.

Also, the washer 10 includes at least one tab or catch 36 that flanks the stop 28 and overlaps the snap ring 12 near the gap 14. As shown in FIG. 1, there preferably is a catch 36 on each side of the stop 28 such that each end of the snap ring 12 on each side of the gap 14 is overlapped by one of the pair of catches 36. By "overlapped" it is meant that the catch 36 is positioned radially outwardly with respect to the outer surface 13 of the snap ring 12. Each catch 36 is formed as a bent tab 38 that includes a substantially radially extending arm 40 and a finger 42 that extends substantially parallel to the axis of the shaft 18. The finger 42 of each of the catches 36 projects over the outer surface 13 of the snap ring 12 in order to prevent displacement of the snap ring 12 from out of the groove 16. Preferably, each catch 36 is formed to extend a few millimeters radially outside the outer surface 13 of the snap ring 12.

The washer 10 is installed on the shaft 18 as follows. The snap ring 12 is positioned in the groove 16 of the shaft 18. Also, the snap ring 12 is oriented in the groove 16 of the shaft 18 such that the gap 14 of the snap ring 12 can receive the stop 28 of the washer 10 upon installation of the washer 10. Then, the washer 10 is installed on the shaft 18 adjacent to the snap ring 12. The teeth 24 of the washer 10 interlock with the splines 26 of the shaft 18. In addition, the stop 28 of the washer 10 nests in the gap 14 of the snap ring 12. Furthermore, the catches 36 of the washer 10 overlap the snap ring 12. Next, the rolling bearing 20 is installed on the shaft 18 adjacent to the washer 10. Preferably, the cone 50 and the rollers 52 of the rolling bearing 20 are installed on the shaft 18 adjacent to the washer 10. The cup 54 of the rolling bearing 20 is pre-installed in a housing (not shown) of a transmission (not shown). The shaft 18 supporting the snap ring 12, the washer 10, and the cone 50 and the rollers 52 of the rolling bearing 20 is installed into the housing (not shown) of the transmission (not shown) such that the cone 50 and the rollers 52 of the rolling bearing 20 are assembled with the cup 54 of the rolling bearing 20 is prevented by interlocking the teeth 24 and the splines 26. Furthermore, rotation of the washer 10 can be prevented in various known ways. For example, a tooth may project radially outwardly from the shaft 18 and into a notch formed in the washer 10. Alternatively, the shaft 18 and the washer 10 may be formed with mating flats. Or, the shaft 18 and the washer 10 may include keyways (not shown) that are matched keyways into which a key is placed.

In this disclosure, there are shown and described several embodiments of the invention, but it is to be understood that the invention is capable of use in various other combinations and environments and is capable of changes or modifications within the scope of the inventive concept as expressed herein.

What is claimed is:

1. A washer for retaining a snap ring in an annular groove of a shaft, the shaft having at least one axially extending spline and the snap ring having opposed ends that define a gap, the washer comprising:

a substantially fiat, annular body adapted to be positioned on the shaft adjacent to the snap ring;

at least one tooth extending from the body for interlocking with the spline of the shaft in order to retain the body from rotating relative to the shaft; and a stop extending from the body including a substantially radially extending leg and a foot that extends substantially perpendicularly from the leg for nesting in the gap in order to retain the snap ring from rotating relative to the shaft.

2. A washer for retaining a snap ring in an annular groove of a shaft, the shaft having at least one axially extending spline and the snap ring having opposed ends that define a gap, the washer comprising:

a substantially fiat, annular body adapted to be positioned on the shaft adjacent to the snap ring;

at least one tooth extending from the body for interlocking with the spline of the shaft in order to retain the body from rotating relative to the shaft;

a stop extending from the body for nesting in the gap in order to retain the snap ring from rotating relative to the shaft, and at least one catch projecting from the body for overlapping the snap ring in order to retain the snap ring in the groove.

3. The washer of claim 2, wherein the catch includes a bent, radially inwardly projecting tab.

4. The washer of claim 2, wherein:

the catch includes a substantially radially extending arm that terminates in a finger that extends substantially perpendicularly from the arm.

5. In combination with a shaft and a snap ring, the shaft having an annular groove and an axially extending spline, and the snap ring being positioned in the groove and having opposed ends defining a gap therebetween, a washer comprising:

a substantially fiat, annular body formed to be positioned on the shaft adjacent to the snap ring;

a tooth that extends substantially radially from the body for interlocking with the spline in order to retain the body from rotating relative to the shaft;

a stop that extends from the body and into the gap for engagement with the opposed ends in order to retain the snap ring from rotating relative to the shaft; and, at least one catch extending from the body for overlapping the snap ring in order to retain the snap ring in the groove.

6. The combination of claim 5, wherein the shaft includes a plurality of axially extending splines, and the body includes a plurality of substantially radially extending teeth engaged with the splines.

7. The combination of claim 5, wherein the washer includes a pair of catches, each of the catches being positioned on one side of the gap, and each of the catches having a substantially radially extending arm and a finger that extends substantially perpendicularly from the arm.

* * * * *

UNITED STATES PATENT AND TRADEMARK OFFICE
CERTIFICATE OF CORRECTION

| | | |
|---|---|---|
| PATENT NO. | : | 5,484,242 |
| DATED | : | 16 January 1996 |
| INVENTOR(S) | : | Duane Fredrick Meyer |

It is certified that error appears in the above-indentified patent and that said Letters Patent is hereby corrected as shown below:

In Col. 3, line 33, delete "fiat" and insert -- flat --.

In Col. 4, lines 1 and 23, delete "fiat" and insert -- flat --.

Signed and Sealed this

Sixteenth Day of July, 1996

Attest:

BRUCE LEHMAN

*Attesting Officer*   *Commissioner of Patents and Trademarks*